(No Model.)

E. P. KING.
APPARATUS FOR MANUFACTURING PLATE GLASS.

No. 517,460. Patented Apr. 3, 1894.

Witnesses.
Jno. L. Condron
Anna Lehaney

Inventor.
Edward P. King
By William Webster
Attorney.

UNITED STATES PATENT OFFICE.

EDWARD P. KING, OF TOLEDO, OHIO.

APPARATUS FOR MANUFACTURING PLATE-GLASS.

SPECIFICATION forming part of Letters Patent No. 517,460, dated April 3, 1894.

Application filed September 4, 1888. Serial No. 284,546. (No model.)

*To all whom it may concern:*

Be it known that I, EDWARD P. KING, a citizen of the United States, residing at Toledo, in the county of Lucas and State of Ohio, have invented certain new and useful Improvements in an Apparatus for Manufacturing Plate-Glass; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to the manufacture of plate-glass, for window panes, mirrors, and similar articles, and the object of my invention is to provide an apparatus which shall rapidly and continuously produce plate-glass, in perfectly finished condition, directly from the melted glass and thus greatly simplify the work heretofore required, and materially lessen the expense, heretofore involved in this class of manufacture.

As will be seen from the ensuing description, I have produced an apparatus which produces the finished plate directly from the melted glass and thus dispenses entirely with the blowing operation, and also with the grinding operation heretofore indispensable in this class of work.

To the above purposes my invention consists in an apparatus having a receptacle for receiving the melted glass, and having also means for imparting pressure to said melted glass while in said receptacle; furthermore, in an apparatus consisting of suitable dies for imparting the required sheet-like form to the glass while in its melted state; also, in the provision of means for heating and cooling the dies so as to heat the glass as it enters said dies, and partially cool the same, as it leaves the dies, for the purpose of retaining the perfect form imparted to the glass by the dies; and my invention finally consists in certain peculiar and novel features of construction and arrangement of parts, all as hereinafter described and claimed.

In order that my invention may be fully understood, I will proceed to describe it with reference to the accompanying drawings in which—

Figure 1:
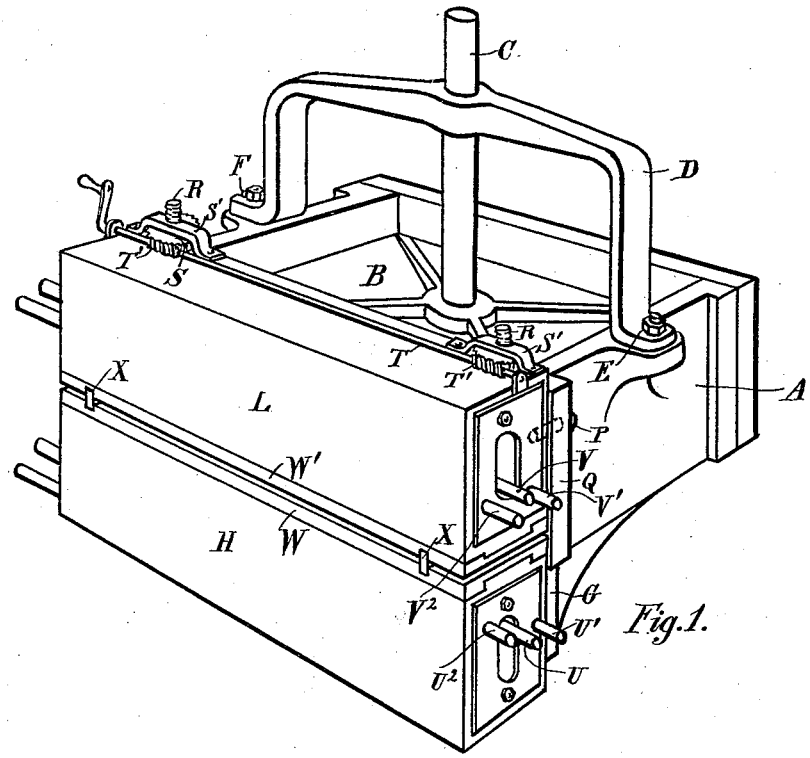
Figure 2:
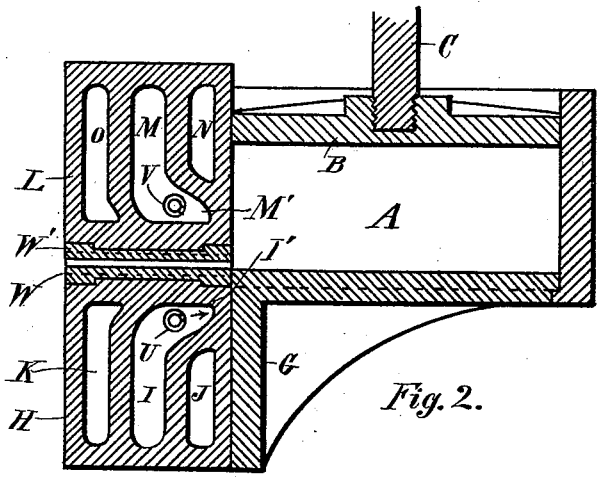

Figure 1 is a perspective view of my improved apparatus. Fig. 2 is a vertical longitudinal section of the same.

In the said drawings A designates a shallow receptacle which is open at its top and also at its front side and into which the melted glass is placed, and B designates a follower which fits snugly into the upper part of receptacle A, and which is provided with a stem C extending vertically upward from the center of said follower B.

D designates an inverted U-shaped guide frame or brace one end of which is bolted pivotally to one side of the receptacle A, as shown at E, and the opposite of which is detachably bolted to the opposite side of said receptacle, as shown at F. The stem C extends upward through an opening in the middle of brace D and its upper end is designed to be connected to any preferred form of gearing such as is adapted to press downward upon stem C and thereby depress the follower B within the receptacle A, for a purpose to be hereinafter described. The arrangement of the brace or guide-frame D is such that by releasing it from the receptacle at F the follower may be raised up out of said receptacle and by turning the frame D on its pivot E the follower and its stem may be moved away toward one side of the receptacle so as to permit the melted glass to be poured into the same. The front end of the bottom of receptacle A is formed with a downward extension G, as is clearly shown in the drawings.

H designates an elongated rectangular metal box which is suitably secured to the front side of the extension G in such position that the upper side of the box shall lie in close proximity to the bottom of the open front side of receptacle A, as shown in Fig. 2. The interior of this box is provided with a central longitudinal chamber I the upper part of which extends laterally upward and rearward toward the rear upward corner of said box, as shown at I'.

Between the rear side of box H and the central chamber I is formed a longitudinal chamber J and between the front side of the box and said central chamber I is formed a longitudinal chamber K similar but of greater height than the inner chamber J.

L designates an elongated rectangular metal box similar in general configuration to the lower box H, and containing internal longitudinal chambers M, N, O, corresponding respectively with the chambers I, J, K, of box H and having the same relative positions and dimensions as the latter recesses. The extension of the central chamber M is located at the bottom of the chamber and extends obliquely rearward and downward toward the lower rear corner of said box L. The upper box L is, however, set movably upon the front of receptacle A, pins P projecting from the rear side of said box and working in slotted guides Q, secured to the front of receptacle A, serving to hold the box in position and to give proper direction to the movements of the same. The required movements of box L are effected by means of screw-rods R rigidly secured to the rear of the said box and extending vertically upward therefrom. These screw-rods extend through the threaded hubs of worm-wheels S, which are held in working position by the straps S' secured to the upper sides of box L, and said wheels are operated by worms T' upon a worm-shaft T which is journaled longitudinally upon the upper side of box L.

U designates a pipe which extends into chamber I of box H near the upper part thereof and which communicates with the source of supply of any suitable combustible material, such as oil or gas but preferably natural gas.

U', U$^2$ designate pipes which are inserted respectively into the chambers J, K, near the upper parts thereof and which communicate with any suitable source of water supply.

V designates a pipe which is inserted into chamber M of box L, near the lower part thereof, and which communicates with the source of fuel supply similar to that of pipe U before referred to.

V', V$^2$, designate pipes which are inserted into chambers N, O, respectively, near the lower parts thereof and which communicate with any suitable source of water-supply similar to that of pipes U', U$^2$, above referred to.

W, W', designate elongated rectangular metal dies or plates which are secured removably upon the upper and lower sides of boxes H, L, respectively and the adjacent faces of which are formed perfectly smooth and regular. These dies correspond exactly in area with the upper and lower sides of boxes H and L so as to completely cover the same.

X, X, designate two elongated plates which are set tightly in transverse grooves in the upper die W', so as to move with box L, and the under parts of which work in transverse grooves in the upper side of die W, said grooves corresponding in form and position with the grooves in die W', but slightly wider than the latter so as to permit the gages to move in the lower grooves, but at the same time to fit snugly therein.

The operation of the above described apparatus is as follows: The gas or other fuel is ignited within chambers I and M of boxes K and L respectively so as to heat the same and the dies W, W', of the same, the heat being especially concentrated in the extensions I', M', of said chambers so as to subject the inner or rear parts of the dies to the greatest of heat. Meanwhile cold water is caused to circulate in chambers J, K, and N, O, the position of the pipes U', U$^2$ and V', and V$^2$, insuring the contact of the coldest portion of the water with the heated surfaces of the boxes. The water in chambers J, N, serves to prevent excessive heating of the inner or rear parts of the boxes and dies, while the water in chambers K, O, serves a purpose to be hereinafter explained. The upper box L is first depressed so as to rest upon the lower box H and bring the dies W, W', into close contact. The follower B is now raised up out of the receptacle A and swung laterally away therefrom, as previously described, and melted glass is poured into said receptacle. The follower B is now swung back into a position and lowered into the receptacle A so as to rest upon the mass of melted glass therein, and pressure is exerted upon the follower by means of its operating connections (not shown) at the upper end of stem C. Everything being now in readiness, the upper box is raised (by means of the worm-gearing above described) such a distance from the lower box as will cause the distance between the dies W, W', to correspond to the thickness or "strength" of glass desired—say for example, the thinnest grade. Now, the melted glass will begin to flow out of the receptacle A between the dies W, W', in the form of a broad flat sheet the width of which is regulated by the gages X, X. As the melted glass flows between the dies the follower B gradually descends into the receptacle A and thus preserves the pressure in the interior of the receptacle. The heat from chambers I, M, acts upon the melted glass as it first enters the dies and thus preserves its perfect fluidity causing it to completely fill the space between the dies, and assume a perfectly smooth and regular sheet-like form, without creases, flaws, or unevenness of any kind. Just as the stream of glass reaches the outer parts of the dies, it is subjected to the cooling action of the water in chambers K, O, and is thus sufficiently set, or solidified, to retain the perfect form imparted by the dies. Now, as the flow of gas continues, different strengths, or grades of thickness, may be produced by successively elevating the upper box above the lower one, thus varying the interval between the dies to accord with the thickness of glass required. This operation is especially advantageous when, by reason of successive pourings of melted glass into receptacle A, the melted glass becomes more solid and its rate of progress through the dies becomes less rapid, and thus the operation is rendered continuous and various strengths or thicknesses of glass may be successively produced. As the glass emerges from the dies it is discharged upon a suitable receiving table and, when it becomes completely cooled, is in perfect condition for the market without further labor than that required in packing and shipping.

Having thus described my invention, what I claim as new therein, and desire to secure by Letters Patent, is—

1. In an apparatus for manufacturing plate glass, the combination, with a receptacle for containing the melted glass, of suitable dies arranged substantially as described, boxes or carriers connected with said dies, and a heating chamber arranged in each carrier, substantially as shown and described, whereby the portions of the dies adjacent to the receptacle are heated while the glass is being passed between the same.

2. In an improved apparatus for the manufacture of plate glass, the combination, with a receptacle for containing the melted glass and provided with an opening for the passage of the same, of suitable dies, arranged as described, for imparting a smooth and sheet-like form to the glass as it passes between them, and boxes or carriers connected with said dies, each box or carrier being provided with a cooling chamber near the outlet end of the dies, substantially as shown and described, whereby the glass is cooled as it is passed from the dies.

3. In an an improved apparatus for manufacturing plate-glass, the combination, with suitable dies, arranged substantially as described, of boxes or carriers connected with the dies, a heating chamber located in each box or carrier near the inner or inlet ends of the dies, and a cooling chamber located in each box near the outer or outlet ends of the dies, whereby the glass as it enters the dies is kept warm and given a smooth and sheet-like form and slowly cooled or annealed as it passes from the dies, substantially as shown and described.

4. In an apparatus for manufacturing plate glass, the combination, with suitable dies, arranged as described, for imparting a smooth and sheet like form to the melted glass, of boxes or carriers connected with each of the dies, a heating chamber formed in each of the boxes and adapted to heat the inner ends of the die-plates, and cooling chambers formed in each of the boxes and located at the front and rear of the heating chamber, whereby the glass is first heated and then cooled; and the inner portions of the dies and boxes are prevented from becoming too hot, substantially as set forth.

5. In an apparatus for manufacturing plate glass, the combination, with a fixed box, carrying a die, of a movable box, also carrying a die and having screw rods extending vertically from the upper side of the same, wheel-nuts suitably supported and adapted to turn upon the screw rods, and a shaft for imparting motion to said wheels, whereby the movable die may be adjusted relative to the thickness of the glass as it is passed between the dies, substantially as shown and described.

6. In an apparatus for manufacturing plate glass, the combination, with a fixed box carrying a die and provided with heating and cooling chambers, of a vertically-adjustable box constructed similar to the fixed box, and carrying vertically-extending screw rods on its upper side, wheel nuts, suitably supported and turning upon the screw rods, a shaft for imparting motion to said wheel nuts, and guides for steadying the motion of the movable box substantially as shown and described.

7. In an apparatus for manufacturing plate glass, the combination, with a fixed box carrying a die plate, of adjustable transverse gage-strips, to limit the width of the glass, a vertically-adjustable box carrying a die plate, screw rods, wheel nuts, turning shaft, and guides to facilitate the adjustment of the movable box, all arranged and adapted to operate substantially as shown and described.

In testimony that I claim the foregoing as my own I hereby affix my signature in presence of two witnesses.

EDWARD P. KING.

Witnesses:
WILLIAM WEBSTER,
ANNA LEHANEY.